United States Patent
Zilberberg et al.

(10) Patent No.: US 9,438,626 B1
(45) Date of Patent: Sep. 6, 2016

(54) RISK SCORING FOR INTERNET PROTOCOL NETWORKS

(71) Applicant: EMC Corporation, Hopkinton, MA (US)

(72) Inventors: Ido Zilberberg, Netanya (IL); Lior Asher, Tel Aviv (IL); Alex Zaslavsky, Petah Tiqva (IL); Marcelo Blatt, Modiin (IL)

(73) Assignee: EMC Corporation, Hopkinton, MA (US)

( * ) Notice: Subject to any disclaimer, the term of this patent is extended or adjusted under 35 U.S.C. 154(b) by 158 days.

(21) Appl. No.: 13/920,500

(22) Filed: Jun. 18, 2013

(51) Int. Cl.
*H04L 29/06* (2006.01)
*G06F 21/55* (2013.01)

(52) U.S. Cl.
CPC ............ *H04L 63/20* (2013.01); *G06F 21/552* (2013.01); *H04L 63/0263* (2013.01); *H04L 63/1416* (2013.01); *H04L 63/1441* (2013.01); *H04L 2463/144* (2013.01)

(58) Field of Classification Search
CPC .......... G06F 21/552; H04L 2463/144; H04L 63/0227; H04L 63/1416; H04L 63/1441
See application file for complete search history.

(56) References Cited

U.S. PATENT DOCUMENTS

| | | | | |
|---|---|---|---|---|
| 5,627,886 A * | 5/1997 | Bowman | ................. | H04M 3/36 379/111 |
| 8,079,083 B1 * | 12/2011 | Bennett | ............... | H04L 63/1416 726/23 |
| 2006/0053490 A1 * | 3/2006 | Herz | .................... | H04L 63/1433 726/23 |
| 2006/0190287 A1 * | 8/2006 | Forshaw | ................ | G06Q 10/08 705/26.1 |
| 2008/0052758 A1 * | 2/2008 | Byrnes | ................ | H04L 63/0263 726/1 |
| 2008/0244748 A1 * | 10/2008 | Neystadt | ............. | H04L 63/1425 726/25 |
| 2009/0083184 A1 * | 3/2009 | Eisen | ...................... | G06Q 20/10 705/50 |
| 2009/0172815 A1 * | 7/2009 | Gu | ......................... | G06F 21/552 726/23 |
| 2010/0235915 A1 * | 9/2010 | Memon | ................. | H04L 63/145 726/23 |
| 2010/0275263 A1 * | 10/2010 | Bennett | ................. | G06F 21/577 726/25 |
| 2011/0251951 A1 * | 10/2011 | Kolkowitz | ............. | G06Q 20/10 705/39 |
| 2011/0252472 A1 * | 10/2011 | Ehrlich | ............... | H04L 63/1441 726/22 |
| 2013/0227016 A1 * | 8/2013 | Risher | .................... | G06Q 10/10 709/204 |
| 2014/0143825 A1 * | 5/2014 | Behrendt | ............... | G06F 21/552 726/1 |
| 2014/0283049 A1 * | 9/2014 | Shnowske | ........... | H04L 63/1441 726/23 |

OTHER PUBLICATIONS

Detecting Malicious Websites by Learning IP Address Features; Daiki Chiba et al.; 2012 IEEE/IPSJ 12th International Symposium on Applications and the Internet; 2012.*
Context-Aware Network Security; Sushant Sinha; University of Michigan; 2009.*

* cited by examiner

*Primary Examiner* — James Turchen
(74) *Attorney, Agent, or Firm* — Ryan, Mason & Lewis, LLP

(57) ABSTRACT

Methods, apparatus and articles of manufacture for risk scoring for internet protocol networks are provided herein. A method includes identifying a network to which a first network element belongs, wherein said first network element comprises corresponding risk-related information, determining each of one or more network elements previously identified as belonging to the network, and calculating a risk score assigned to the network, wherein said calculating comprises aggregating (i) the risk-related information corresponding to the first network element and (ii) risk-related information corresponding to each of the one or more network elements previously identified as belonging to the network.

20 Claims, 3 Drawing Sheets

RISK SCORING FOR INTERNET PROTOCOL NETWORKS

FIELD

The field relates generally to information technology, and more particularly to fraud detection.

BACKGROUND

Electronic fraud networks (EFNs) include collaborative cross-institution online networks dedicated to sharing and disseminating information on fraudulent activity to help facilitate and maintain security for its customers. EFN customers commonly share information on fraudulent activities, whereby data elements that are found to participate in potentially fraudulent transactions (as well as data elements found to participate in genuine non-fraudulent activities) are passed to a central engine for processing. Routinely, in existing EFN-based fraud detection approaches, such identified data elements are also assigned a risk score.

A risk score determines the likelihood that a given data element (for example, an internet protocol (IP) address) will be a source of additional fraud in the future. In existing EFN systems and approaches, a risk score is calculated, for example, for an IP address based solely on the history of fraudulent and/or genuine transactions associated with that particular IP address. Consequently, it is possible for a fraudster to commit fraud from a first IP address, subsequently receive a second IP address on the same network, and continue to carry out fraudulent activity without being associated with the risk score ultimately attributed to the first IP address.

Accordingly, a need exists for identifying and encompassing a broader range of data elements for the purpose of assigning risk scores.

SUMMARY

One or more illustrative embodiments of the present invention provide risk scoring for internet protocol networks.

In accordance with an aspect of the invention, a method is provided comprising the steps of: identifying a network to which a first network element belongs, wherein said first network element comprises corresponding risk-related information, determining each of one or more network elements previously identified as belonging to the network, and calculating a risk score assigned to the network, wherein said calculating comprises aggregating (i) the risk-related information corresponding to the first network element and (ii) risk-related information corresponding to each of the one or more network elements previously identified as belonging to the network.

In accordance with another aspect of the invention, a method is provided comprising the steps of: obtaining an item of input data from an entity, wherein said item of input data comprises identification of a first network element and corresponding risk-related information, identifying a network to which the first network element belongs, and determining each of one or more network elements previously identified as belonging to the network. This aspect of the invention additionally comprises the steps of calculating a risk score assigned to the network based on (i) the risk-related information corresponding to the first network element, (ii) risk-related information corresponding to each of one or more network elements previously identified as belonging to the network, and (iii) one or more items of information pertaining to a level of trust associated with the entity, and applying the risk score assigned to the network to the first network element and to each of the one or more network elements previously identified as belonging to the network.

The fraud detection techniques of the illustrative embodiments overcome one or more of the problems associated with the conventional techniques described previously, and provide increased accuracy for risk assessment. These and other features and advantages of the present invention will become more readily apparent from the accompanying drawings and the following detailed description.

DETAILED DESCRIPTION

As will be described, the present invention, in one or more illustrative embodiments, provides techniques for assigning risk scoring for internet protocol (IP) networks. At least one embodiment of the invention includes calculating a risk score for a given network based on aggregated fraud-related data that originated from various IP addresses with that network, as said items of data are fed into an EFN over time. Accordingly, calculating a risk score for a network (as opposed to merely calculating risk scores for individual IP addresses therein) enables an EFN to increase the risk score associated with potentially risky or fraudulent IP addresses that may have otherwise been deemed low-risk (potentially permitting fraudulent activity to be carried out by such an IP address). By way of example, customers utilizing an EFN can include, for example, financial institutions as well as other companies and businesses, and such customers have end users (for example, individuals) using the customer's system.

Additionally, at least one embodiment of the invention includes calculating a risk score for a sub-network, also referred to herein as a subnet, associated with multiple IP addresses. As used herein, a subnet refers to a sub-division of an IP network. Additionally, by way of further illustration, all computers that belong to a given subnet can include an identical bit-group in their IP address.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
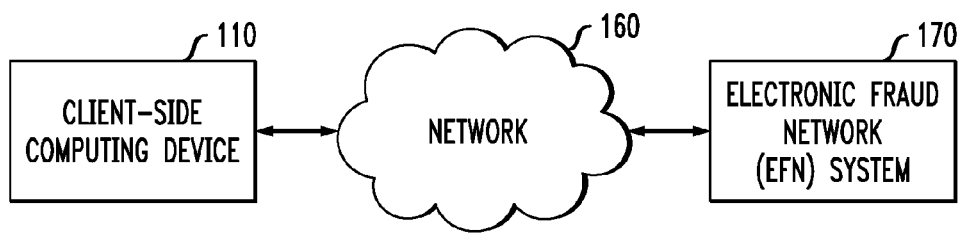
FIG. 1 is a diagram illustrating an example network environment in which one or more embodiments of the present invention can operate.

FIG. 1 illustrates an example client-side computing device (CSCD) 110 communicating with an electronic fraud network (EFN) system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the EFN system 170 (or, for example, an EFN agent) with data. Such an embodiment can be implemented within the context of a business-to-business (B2B) application. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of fraud detection techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "customer." The term "customer," as used in this context, should be understood to encompass, by way of example and without limitation, a customer device, a person utilizing or otherwise associated with the device, or a combination of both. An operation described herein as being performed by a customer may therefore, for example, be performed by a customer device, a person utilizing or otherwise associated with the device, or by a combination of both the person and the device. Similarly, information described as being associated with a customer may, for example, be associated with a CSCD device 110, a person utilizing or otherwise associated with the device, or a combination of both the person and the device.

An exemplary EFN system (such as system 170 in FIG. 1) is described in additional detail below in connection with FIG. 2.

Figure 2:
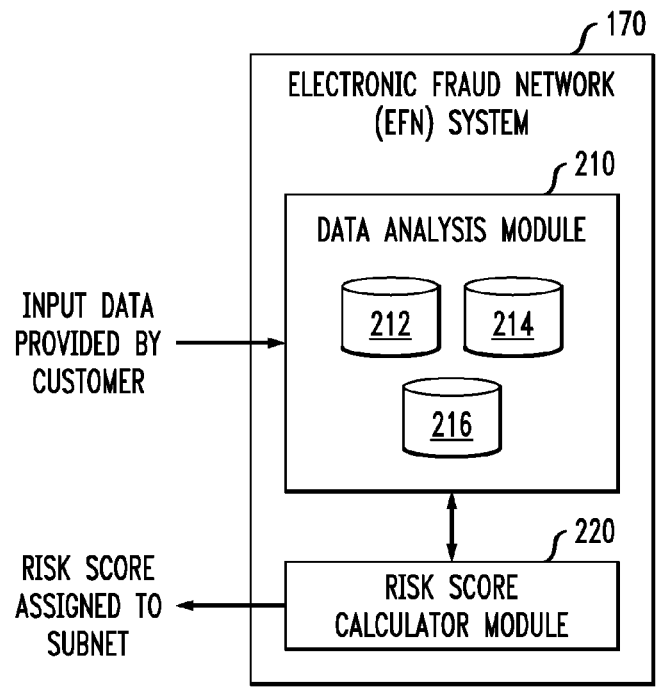
FIG. 2 is a block diagram illustrating example system components, according to an embodiment of the invention.

FIG. 2 is a block diagram illustrating example system components, according to an embodiment of the invention. By way of illustration, FIG. 2 depicts EFN system 170, as noted above, which receives input data provided by a customer and outputs a risk score assigned to a subnet. As noted herein, input data provided by a customer can include, for example, the identification of data elements (for example, in list form) that are found to participate in activities deemed potentially fraudulent by the customer, as well as the identification of data elements that are found to participate in activities deemed non-fraudulent by the customer. Additionally, as described herein, the risk score output by EFN system 170 is generated based on the input data as well as stored previous data pertaining to related networks and/or IP addresses.

As depicted in FIG. 2, EFN system 170 includes a data element module 210 and a risk score calculator module 220. As described further herein, the data element module 210 can include multiple databases, such as IP address database 212, containing data elements and related information pertaining to a specific IP address. By way of example, IP address database 212 can include historical data, that is, data elements previously provided by and/or shared by a customer pertaining to that IP address. Additionally, the data element module 210 can process incoming input data and store such data in an appropriate IP address database. Data provided to IP address databases can include various customer submissions pertaining to a given IP address indicating that the IP address was deemed likely fraudulent or not likely fraudulent with respect to a particular transaction. Aggregation of such data over a time window (for example, the last 30 days) can yield risk scores for the subnets containing all of the origin IP addresses of said transactions.

Additionally, the data element module 210 can include multiple databases, such as customer database 214, containing data elements and related information pertaining to a specific customer within the EFN. Similarly, customer database 214 can store historical data elements and information previously provided by and/or shared by that corresponding customer over the course of past EFN activities. Additionally, as with input IP address data, the data analysis module can process incoming input data and store such data in an appropriate customer database. Further, one or more embodiments of the invention can be implemented without incorporation of information from a customer database such as database 214.

The data element module 210 can also include multiple databases, such as subnet database 216, containing historical data and/or information pertaining to a given network or subnet. Such a database can include information including an identification of IP addresses within the given network or subnet, any individual risk scores associated with those individual IP addresses, as well as previous risk score calculations associated with the given network or subnet.

Further, as noted above, the EFN system 170 includes a risk score calculator module 220. The risk score calculator module 220 utilizes information contained within the data element module to generate a risk score associated with a given network or subnet. For example, the risk score calculator module 220 can obtain information pertaining to a given IP address via IP address database 212 (or receive information pertaining to a given IP address from the data element module 210 upon receipt of such data from a customer). Accordingly, the risk score calculator module 220 can identify the subnet corresponding to this IP address, for example, by performing a search for said IP address in subnet database 216, or by having the customer or an EFN agent provide subnet data along with the IP address of the transaction. Once a correct subnet (that is, a subnet containing the given IP address) is identified, the risk score calculator module 220 determines which additional IP addresses already stored in the EFN database (for example, subnet database 216) are additionally contained within and/or associated with this identified subnet. This can be accomplished, for example, by analyzing the information stored within subnet database 216 corresponding to this subnet. Additionally, the risk score calculator module 220 can also access the subnet database (database 216 being merely one example) corresponding to the identified subnet in question to obtain relevant information such as previous risk scores, etc. At least one embodiment of the invention includes using such previous risk score(s) as a starting point for a subsequent risk score calculation for the corresponding subnet, and updating the previous risk score(s) based on new and/or modified information pertaining to one or more of the IP addresses belonging to the subnet.

Upon determining the collection of IP addresses associated with this identified subnet, the risk score calculator module 220 subsequently calculates a risk score for the subnet based on the aggregated input of all previously identified IP addresses belonging to this subnet (that is, all IP addresses stored in the EFN databases that belong to this subnet). To carry out this calculation, the risk score calculator module 220 can leverage information stored within the databases contained within the data element module 210. For example, for each of the identified IP addresses belonging to this subnet, the risk score calculator can access the IP address database corresponding thereto (database 212 being merely one example) to obtain information pertaining to the risk level associated with each such IP address. Consequently, information pertaining to the risk level of each such IP address is aggregated by the risk score calculator module 220 to generate a risk score associated with the subnet.

With respect to aggregating data corresponding to individual IP addresses, at least one embodiment of the invention can include the following. For each IP address, EFN system 170 calculates a risk score based on the number of "fraud" and "genuine" indicators from all customers, for a given time window (for instance, the last 30 days). The EFN system can then, in one example, take the average of such risk scores over all identified IP addresses belonging to a specific subnet and assign this average to the subnet. Any additional IP addresses within this subnet that the EFN system encounters, even if marked as low risk, will be considered in light of being part of this subnet, and can be assigned that subnet's risk score. It is also noted that if a customer provides an IP address with a "Fraud Confirmed" indication, the EFN system may update the relevant subnet's risk score, but the IP itself will be retained with said "Fraud Confirmed" indication. In other words, at least one embodiment of the invention will not include lowering risk scores for IP addresses; rather, risk scores for individual IP addresses will only be raised if deemed necessary by the risk score of the corresponding subnet.

Additionally, as further described herein, at least one embodiment of the invention can include considering an originating customer's trust or confidence level when taking into account a given IP address risk score.

Also, in at least one embodiment of the invention, the risk score calculator module 220 can also access one or more customer databases (database 214 being merely one example) to incorporate information pertaining to one or more customers that provided data in connection with one or more of the IP addresses belonging to the subnet in question. By way of example, a given customer database can include customer-specific trust information based on previous assessments and/or feedback pertaining to the accuracy and/or quality of the input data provided by the given customer. Accordingly, in at least one embodiment of the invention, a risk score calculation for a given subnet can include an aspect of weighting input data (and related IP address-specific data) based on the particular customer that provided said input data, and the level of trust associated with that customer. By way of example, the input data being provided by a customer having a higher trust measure will be correspondingly weighted so as to have a larger effect on any subsequent risk score calculation than the input data provided by a customer having a lower trust measure.

In connection with the depiction in FIG. 2, consider the following use case example wherein a fraudster participates in fraudulent activity from a first IP address. Assuming that the fraud was detected and marked in the case management of the relevant entity (that is, customer), the fraudster can nonetheless subsequently obtain a different second IP address by releasing the first IP address and renewing a request for an IP address. Commonly, a similar but not identical IP address will be provided to the fraudster in such a scenario.

Accordingly, EFN system 170 will receive input data from the relevant customer identifying the first IP address as having participated in fraudulent activity. Such information will be processed and stored by data element module 210. The risk score calculator module 220 can also receive this input data pertaining to the first IP address, at which point the risk score calculator module 220 can access the relevant IP address database in data element module 210 to determine additional information pertaining to this first IP address, as well as access and search subnet databases to extract a subnet to which this first IP address belongs. Once the appropriate subnet is identified, the risk calculator module 220 can identify all additional IP addresses belonging to that subnet which are part of IP address database 212, and aggregate risk-related information corresponding to these additional IP addresses (obtained via the relevant IP address databases) to generate a risk score for the entire subnet. Also, in one or more embodiments of the invention, the risk score calculator module 220 can additionally incorporate trust-related information and/or measures associated with any relevant customers that had provided data to be used in the generation of this subnet risk score.

Consequently, to continue with the above example use case scenario, the EFN system generates a risk score corresponding to the subnet to which the first IP address belongs, thereby encompassing the fraudulent activity enacted by the fraudster before the fraudster transitioned to a different IP address. Accordingly, subsequent transactions originating from other IP addresses belonging to that subnet (such as the second IP address, in the above example), and for which no fraud was previously marked by customers, would receive a higher risk score as a result of the fraudster's previous fraudulent activity carried out via the first IP address. As such, at least one embodiment of the invention includes providing customers with subnet risk score data in addition to specific IP address risk score data. Customers may utilize this information, for example, to add new rules to their systems, to block transactions from IP addresses belonging to said subnets, etc.

One or more embodiments of the invention can additionally be implemented in the context of a network infected by malware, wherein each device within the network might be compromised. Evaluating the subnet in such a scenario can lead to more accurate risk scoring.

Figure 3:
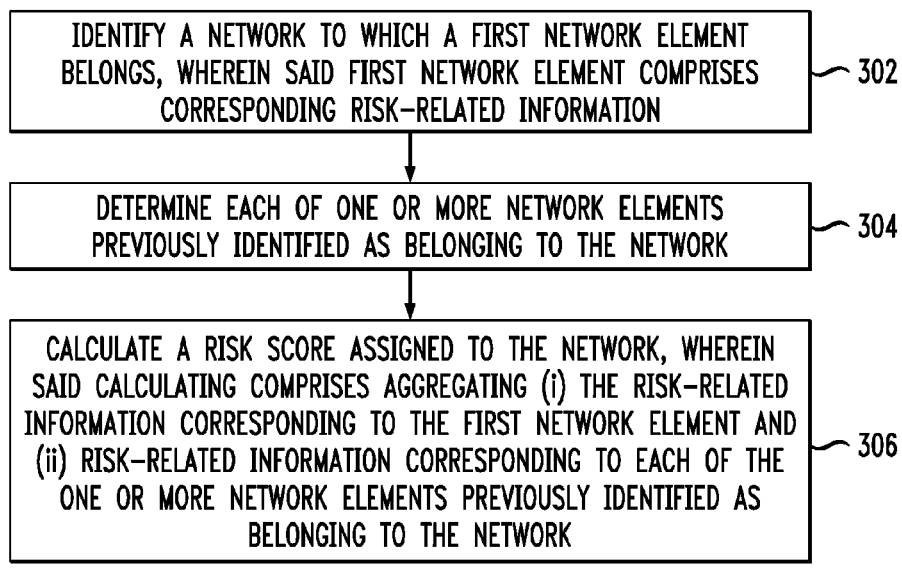
FIG. 3 is a flow diagram illustrating techniques according to an embodiment of the invention.

FIG. 3 is a flow diagram illustrating techniques according to an embodiment of the present invention. Step 302 includes identifying a network to which a first network element belongs, wherein said first network element comprises corresponding risk-related information. For example, the first network element can be identified as having participated in fraudulent activity or non-fraudulent activity by an entity reporting said first network element address to a fraud detection system. Also, the identifying step can include searching one or more network databases to identify an entry corresponding to the first network element, and/or receiving directly from a customer, as part of data input to identify, an entry corresponding to the first network element.

Step 304 includes determining each of one or more network elements previously identified as belonging to the network. As described herein, the first network element and each additional network element can be an internet protocol address. Also, the determining step can include analyzing information pertaining to the network to identify each previously identified network element belonging thereto.

Step 306 includes calculating a risk score assigned to the network, wherein said calculating comprises aggregating (i) the risk-related information corresponding to the first network element and (ii) risk-related information corresponding to each of the one or more network elements previously identified as belonging to the network. The risk-related information corresponding to each network element can be a risk score assigned to the network element.

The techniques depicted in FIG. 3 can also include applying the risk score assigned to the network to the first network element and to each of the one or more network elements previously identified as belonging to the network. Additionally, at least one embodiment of the invention includes iteratively updating the risk score assigned to the network upon receipt of each additional item of risk-related information pertaining to a network element belonging to the network.

Figure 4:
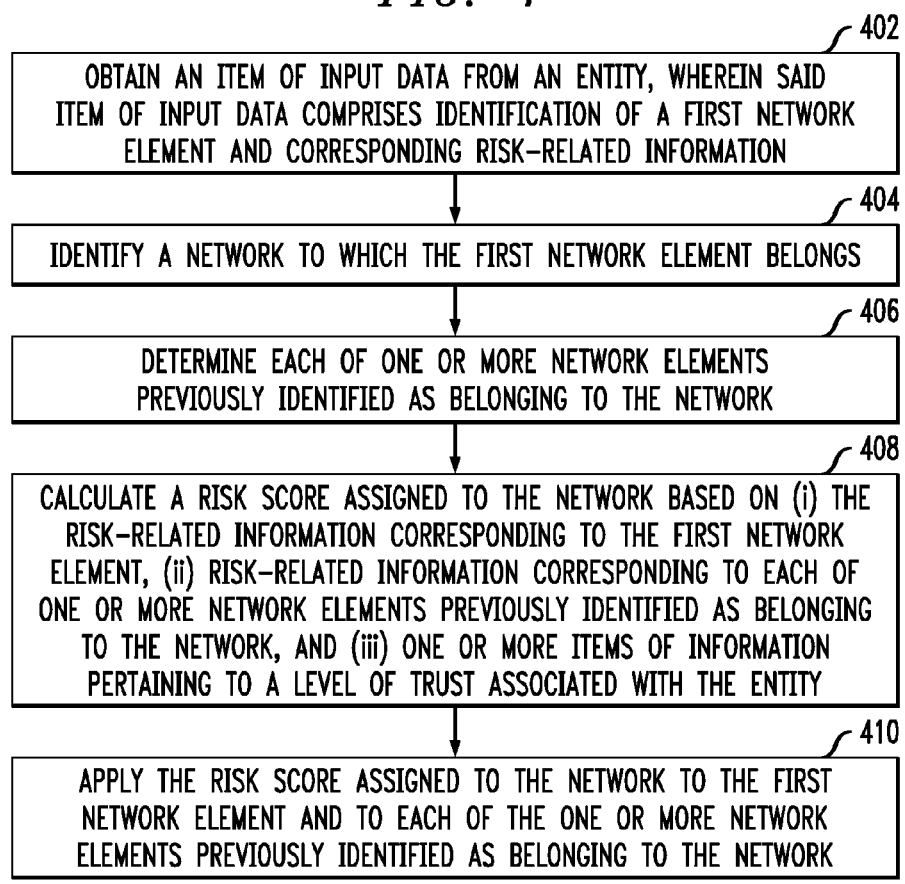
FIG. 4 is a flow diagram illustrating techniques according to an embodiment of the invention.

FIG. 4 is a flow diagram illustrating techniques according to an embodiment of the present invention. Step 402 includes obtaining an item of input data from an entity, wherein said item of input data comprises identification of a first network element and corresponding risk-related information. Step 404 includes identifying a network to which the first network element belongs. Step 406 includes determining each of one or more network elements previously identified as belonging to the network (for example, IP addresses already present in the IP address database). As noted herein, the first network element and each additional network elements can be an internet protocol address.

Step 408 includes calculating a risk score assigned to the network based on (i) the risk-related information corresponding to the first network element, (ii) risk-related information corresponding to each of one or more network elements previously identified as belonging to the network, and (iii) one or more items of information pertaining to a level of trust associated with the entity. Calculating the risk score based on items of information pertaining to a level of trust associated with the entity can include applying a weight to each item of risk-related information based on a level of trust associated with each entity responsible for providing the item of risk-related information. As additionally noted herein, the risk-related information corresponding to each network element can be a risk score assigned to the network element.

Step 410 includes applying the risk score assigned to the network to the first network element and to each of the one or more network elements previously identified as belonging to the network. Additionally, the techniques depicted in FIG. 4 can also include iteratively updating the risk score assigned to the network upon receipt of each additional item of risk-related information pertaining to a network element belonging to the network.

Figure 5:
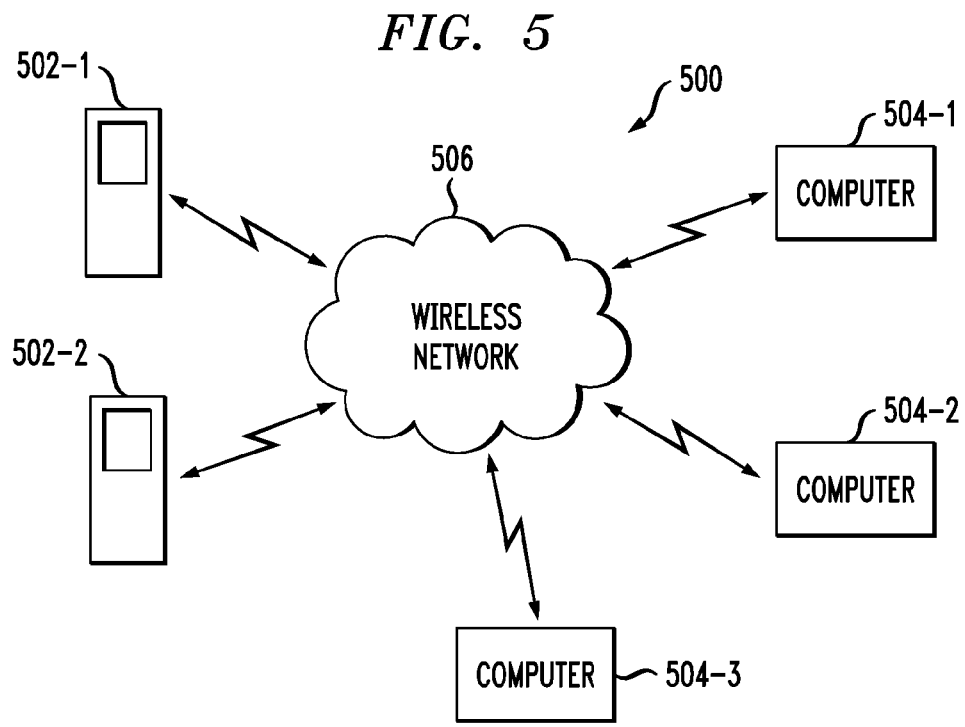
FIG. 5 shows an exemplary embodiment of a communication system that may incorporate the functionality of the type illustrated in at least one embodiment of the invention.

Fraud detection techniques of the type described herein may be implemented in a wide variety of different applications. One exemplary communication system applications that may incorporate such techniques will now be described with reference to FIG. 5. Accordingly, FIG. 5 depicts a communication system 500 comprising a plurality of mobile telephones 502-1 and 502-2 and computers 504-1, 504-2 and 504-3, configured to communicate with one another over a network 506.

Any two or more of the devices 502 and 504 may correspond to cryptographic devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 6:
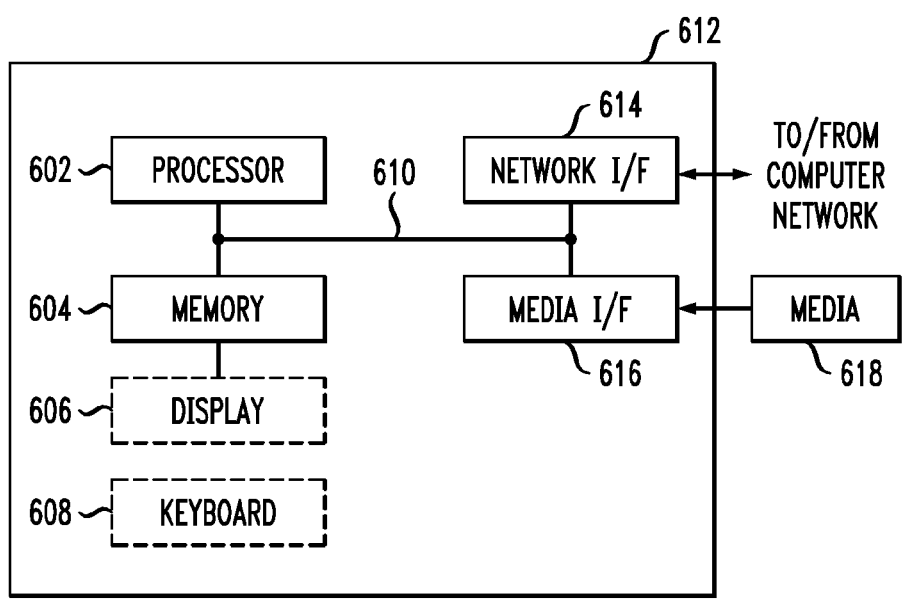
FIG. 6 is a system diagram of an exemplary computer system on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from fraud detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
   identifying a network to which a first network element belongs, wherein said first network element comprises corresponding risk-related information comprising one of (i) a fraudulent activity on the network within a given time period and (ii) a genuine activity on the network within the given time period;
   determining each of multiple network elements previously identified as belonging to the network, wherein said multiple network elements comprise risk-related information comprising (i) one or more fraudulent activities on the network within the given time period and (ii) one or more genuine activities on the network within the given time period;
   calculating a risk score assigned to the network to attribute a likelihood of fraudulent activity to occur in connection with any of the network elements belonging to the network, wherein said calculating comprises aggregating (i) the risk-related information corresponding to the first network element and (ii) the risk-related information corresponding to the multiple network elements previously identified as belonging to the network, and wherein said calculating further comprises applying a weight to each item of risk-related information based on a level of trust associated with each entity responsible for providing the item of risk-related information;
   applying the risk score assigned to the network to (i) the first network element and (ii) to each of the multiple network elements previously identified as belonging to the network, thereby attributing the same likelihood of fraudulent activity occurring in connection with (i) the first network element and (ii) each of the multiple network elements previously identified as belonging to the network; and
   iteratively updating the risk score assigned to the network upon receipt of each additional item of risk-related information pertaining to any network element belonging to the network;
   wherein the steps are carried out by at least one computing device.

2. The method of claim 1, wherein each of said network elements comprises an internet protocol address.

3. The method of claim 1, wherein said identifying comprises searching one or more network databases to identify an entry corresponding to the first network element.

4. The method of claim 1, wherein said identifying comprises receiving an entry corresponding to the first network element directly from a customer.

5. The method of claim 1, wherein said determining comprises analyzing information pertaining to the network to identify each previously identified network element belonging thereto.

6. The method of claim 1, wherein said first network element is identified as having participated in fraudulent activity by an entity reporting said first network element to a fraud detection system.

7. The method of claim 1, wherein said risk-related information corresponding to the first network element comprises a risk score assigned to the first network element, and wherein said risk-related information corresponding to each of the multiple network elements previously identified as belonging to the network comprises a risk score assigned to each of the multiple network elements previously identified as belonging to the network.

8. An article of manufacture comprising a non-transitory processor-readable storage medium having processor-readable instructions tangibly embodied thereon which, when implemented, cause a processor to carry out steps comprising:
   identifying a network to which a first network element belongs, wherein said first network element comprises corresponding risk-related information comprising one of (i) a fraudulent activity on the network within a given time period and (ii) a genuine activity on the network within the given time period;
   determining each of multiple network elements previously identified as belonging to the network, wherein said multiple network elements comprise risk-related information comprising (i) one or more fraudulent activities on the network within the given time period and (ii) one or more genuine activities on the network within the given time period;
   calculating a risk score assigned to the network to attribute a likelihood of fraudulent activity to occur in connection with any of the network elements belonging to the network, wherein said calculating comprises aggregating (i) the risk-related information corresponding to the first network element and (ii) the risk-related information corresponding to the multiple network elements previously identified as belonging to the network, and wherein said calculating further comprises applying a weight to each item of risk-related information based on a level of trust associated with each entity responsible for providing the item of risk-related information;
   applying the risk score assigned to the network to (i) the first network element and (ii) to each of the multiple network elements previously identified as belonging to the network, thereby attributing the same likelihood of fraudulent activity occurring in connection with (i) the first network element and (ii) each of the multiple network elements previously identified as belonging to the network; and iteratively updating the risk score assigned to the network upon receipt of each additional item of risk-related information pertaining to any network element belonging to the network.

9. The article of manufacture of claim 8, wherein each of said network elements comprises an internet protocol address.

10. The article of manufacture of claim 8, wherein said identifying comprises searching one or more network databases to identify an entry corresponding to the first network element.

11. The article of manufacture of claim 8, wherein said identifying comprises receiving an entry corresponding to the first network element directly from a customer.

12. The article of manufacture of claim 8, wherein said determining comprises analyzing information pertaining to the network to identify each previously identified network element belonging thereto.

13. An apparatus comprising:
a memory; and
at least one processor coupled to the memory and configured to:
identify a network to which a first network element belongs, wherein said first network element comprises corresponding risk-related information comprising one of (i) a fraudulent activity on the network within a given time period and (ii) a genuine activity on the network within the given time period;
determine each of multiple network elements previously identified as belonging to the network, wherein said multiple network elements comprise risk-related information comprising (i) one or more fraudulent activities on the network within the given time period and (ii) one or more genuine activities on the network within the given time period;
calculate a risk score assigned to the network to attribute a likelihood of fraudulent activity to occur in connection with any of the network elements belonging to the network, wherein said calculating comprises aggregating (i) the risk-related information corresponding to the first network element and (ii) the risk-related information corresponding to the multiple network elements previously identified as belonging to the network, and wherein said calculating further comprises applying a weight to each item of risk-related information based on a level of trust associated with each entity responsible for providing the item of risk-related information;
apply the risk score assigned to the network to (i) the first network element and (ii) to each of the multiple network elements previously identified as belonging to the network, thereby attributing the same likelihood of fraudulent activity occurring in connection with (i) the first network element and (ii) each of the multiple network elements previously identified as belonging to the network; and
iteratively update the risk score assigned to the network upon receipt of each additional item of risk-related information pertaining to any network element belonging to the network.

14. The apparatus of claim 13, further comprising:
one or more databases for storing risk-related information pertaining to one or more network elements.

15. The apparatus of claim 13, further comprising:
one or more databases for storing risk-related information pertaining to one or more networks.

16. A method comprising:
obtaining an item of input data from an entity, wherein said item of input data comprises identification of a first network element and corresponding risk-related information comprising one of (i) a fraudulent activity on the network within a given time period and (ii) a genuine activity on the network within the given time period;
identifying a network to which the first network element belongs;
determining each of multiple network elements previously identified as belonging to the network, wherein said multiple network elements comprise risk-related information comprising (i) one or more fraudulent activities on the network within the given time period and (ii) one or more genuine activities on the network within the given time period;
calculating a risk score assigned to the network to attribute a likelihood of fraudulent activity to occur in connection with any of the network elements belonging to the network based on (i) the risk-related information corresponding to the first network element, (ii) the risk-related information corresponding to the multiple network elements previously identified as belonging to the network, and (iii) one or more items of information pertaining to a level of trust associated with the entity, wherein said calculating comprises applying a weight to each item of risk-related information based on a level of trust associated with each entity responsible for providing the item of risk-related information;
applying the risk score assigned to the network to (i) the first network element and to (ii) each of the multiple network elements previously identified as belonging to the network, thereby attributing the same likelihood of fraudulent activity occurring in connection with (i) the first network element and (ii) each of the multiple network elements previously identified as belonging to the network; and
iteratively updating the risk score assigned to the network upon receipt of each additional item of risk-related information pertaining to any network element belonging to the network;
wherein the steps are carried out by at least one computing device.

17. The method of claim 16, wherein said first network element comprises an internet protocol address.

18. The method of claim 16, wherein said risk-related information corresponding to the first network element comprises a risk score assigned to the first network element.

19. The method of claim 16, wherein each of the one or more network elements previously identified as belonging to the network comprises an internet protocol address.

20. The method of claim 16, wherein said risk-related information corresponding to each of the multiple network elements previously identified as belonging to the network comprises a risk score assigned to each of the multiple network elements.

* * * * *